May 15, 1928.  
G. V. GAVAZA  
1,669,978  
COMBINED SINK FAUCET AND DISHWASHING FIXTURE  
Filed June 16, 1926    2 Sheets-Sheet 1
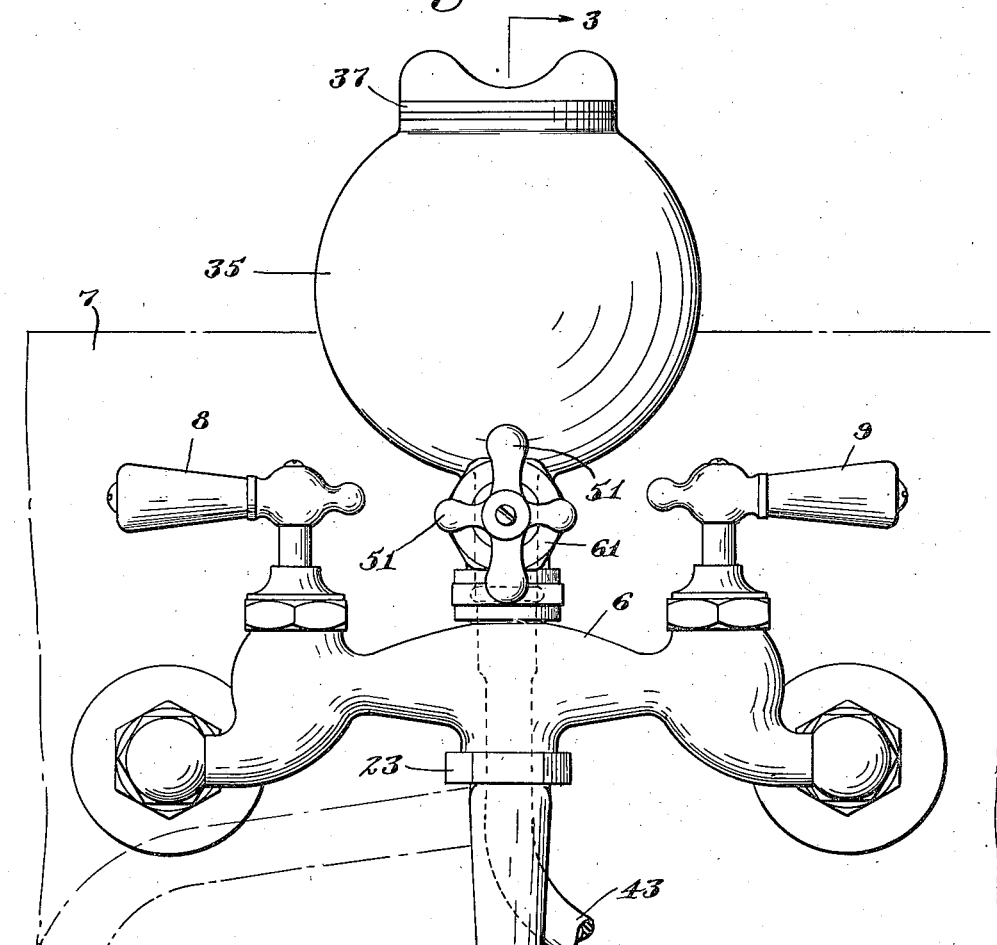
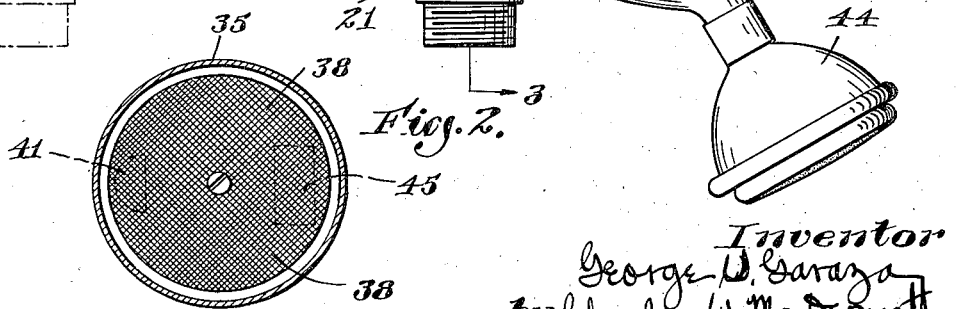

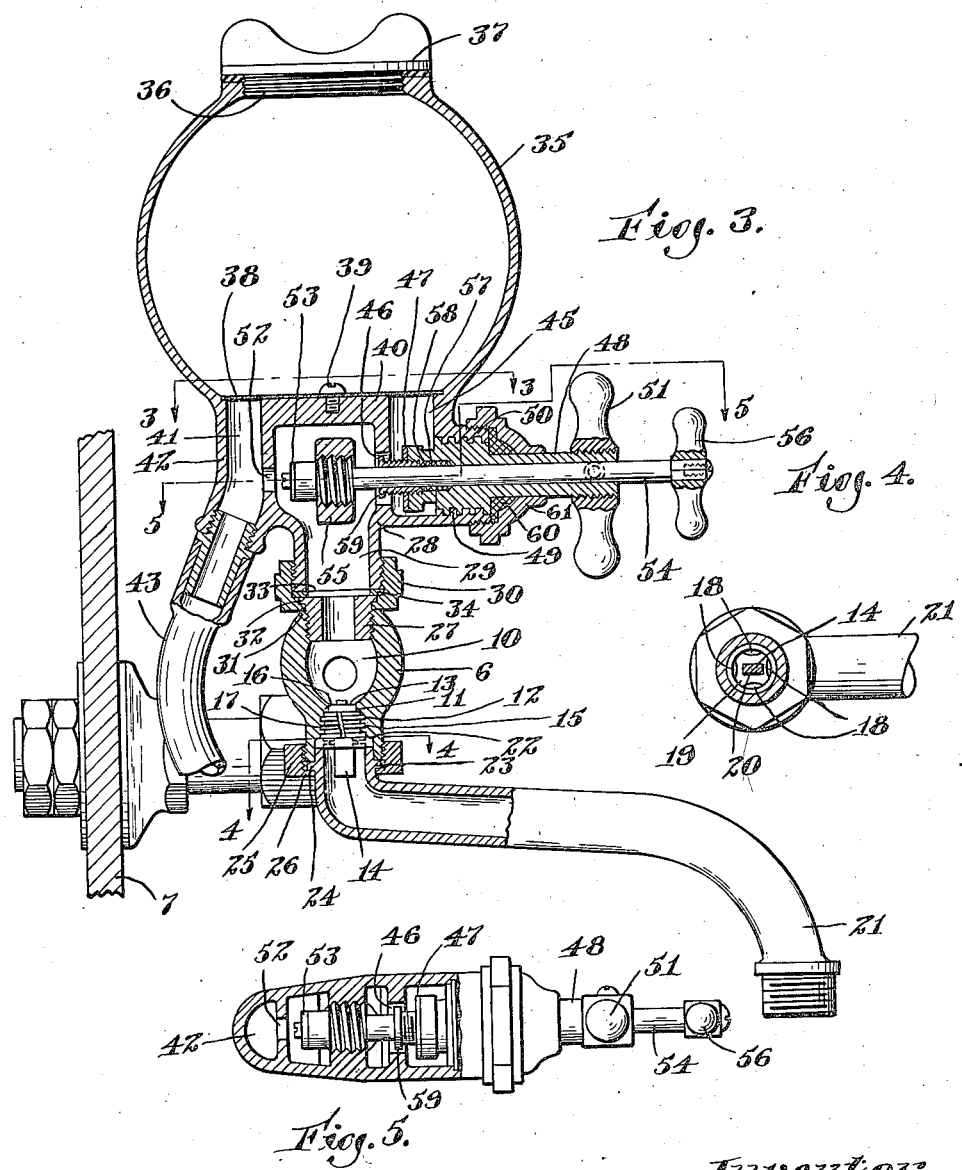

Patented May 15, 1928.

1,669,978

UNITED STATES PATENT OFFICE.

GEORGE VICTOR GAVAZA, OF QUINCY, MASSACHUSETTS.

COMBINED SINK FAUCET AND DISHWASHING FIXTURE.

Application filed June 16, 1926. Serial No. 116,496.

The present invention relates to faucet fixtures, and more particularly to faucet fixtures for kitchen sinks.

It has been proposed heretofore to provide kitchen sinks with devices containing a soap reservoir which may be attached to a sink faucet for use in washing dirty dishes. The connection and disconnection of these devices to the sink faucet at every dish washing operation, however, prevented their commercial success although it has long been recognized that such devices would be helpful in reducing the labor of a disagreeable household duty.

The object of the present invention is to produce a combined sink faucet and dish washing fixture whereby the dish washing operation may be performed in an easy manner.

To the accomplishment of this object, and such others as may hereinafter appear, the various features of the present invention relate to certain devices, constructions and arrangements of parts as fully set forth hereinafter, the advantages of which will be readily understood by those skilled in the art.

The various features of the present invention will be readily understood from an inspection of the accompanying drawings illustrating the best form of the invention at present known to the inventor, in which, Figure 1 is a front elevation of the combined sink faucet and dish washing fixture;

Fig. 2 is a sectional plan on the line 2—2, Fig. 3;

Fig. 3 is a right side sectional elevation;

Fig. 4 is a detail in sectional plan on the line 4—4, Fig. 3, and

Fig. 5 is a detail in sectional plan on the line 5—5, Fig. 3.

Referring to the drawings a hot and cold water fixture 6 is secured in the usual way to the back board of a sink 7. This fixture 6 is provided with valves 8 and 9 (Fig. 1) for controlling the admission of the hot and cold water to a mixing chamber 10 (Fig. 3). Opening downward from the mixing chamber 10 is an elongated port 11 provided with internal threads 12. The port 11 may be closed by a valve 13 having a rectangular stem 14 the upper portion of which is secured to a nut 15 having threads which engage the threads 12.

Rotation of the nut 15 in one direction seats the valve 13 on a seat 16 formed in the upper portion of the port 11. Rotation of the nut 15 in the other direction unseats the valve 13 in order that water may flow through the port 11 and down channels 17 (Fig. 3) formed by mutilating the threads of the nut 15 in four places. The channels 17 conduct the water to four openings 18 (Fig. 4) formed in the periphery of a collar 19 provided with a rectangular opening 20 which loosely embraces the stem 14. The collar 19 is secured to one end of a faucet 21 so that the water may flow through the channels 18 into the faucet 21 for discharge into the sink. The faucet 21 is mounted to swing about an axis passing through the port 11 from the dotted line position of Fig. 2, in which position the port 11 is closed, to the full line position of Fig. 2, in which position the port 11 is open. To this end the port 11 is provided with an annular shoulder 22 upon which the collar 19 rotates. The faucet 21 is also provided with an annular shoulder 23 which engages the mouth 24 of the port 11. The collar 19 and shoulder 23 are held in engagement with the shoulder 22 and mouth 24, respectively, by a nut 25 threaded on the external wall of the port 11 and provided with an inturned lip 26 arranged to engage underneath the shoulder 23.

Threaded into the mixing chamber 10 is a nipple 27 which supports the dish washing fixture. This fixture is formed from a single casting having a central chamber 29 the external wall of which is threaded to receive a nut 30 having an inturned lip 31 arranged to engage beneath an annular shoulder 32 on the nipple 27. Interposed between the nipple 27 and the mouth 33 of the chamber 29 is a washer 34.

Above the chamber 29 a reservoir 35 is formed into which scrap pieces of soap may be placed through an opening 36 which is normally closed by a screw-threaded cover 37. The soap in the reservoir 35 is supported by a circular screen 38 secured by a screw 39 to the bottom 40 of the reservoir. Formed in the bottom 40 is an outlet 41 (Fig. 2) which is extended along one wall of the chamber 29 to form a dish-washing conduit 42 to which one end of a hose 43 is attached. The other end of the hose 43 is provided with a spray nozzle 44 (Fig. 1) through which water may be sprayed upon the dirty dishes in the sink.

The bottom 40 of the reservoir 35 is also provided with an inlet 45 (Fig. 2). In order to permit water to flow from the chamber 29 into the inlet 45 and the reservoir 35 the chamber 29 is provided with a port 46. This port 46 is controlled by a valve 47 carried on one end of a hollow stem 48 provided with screw threads 49 arranged to engage similar threads 50 formed in the dish-washing fixture casting. Outside the casting the stem 48 is provided with a handle 51 by which the stem 48 may be rotated to cause the valve 47 to close the port 46.

A second port 52 is formed in the wall of the chamber 29 opposite, and in the same longitudinal axis as the port 46. This port 52 may be closed by a valve 53 carried on one end of a stem 54 a portion of which is threaded to engage a threaded bridge 55 extending across the chamber 29. The stem 54 extends within the stem 48 and is provided on its free outside end with a handle 56 by which the stem 54 may be rotated to cause the valve 53 to close the port 52.

Leakage of water between the stems 48 and 54 is prevented by suitable packing 57 which is held in a cavity 58 formed in the stem 48 by a gland nut 59 rotatably mounted on the stem 54 and provided with external threads for engagement with internal threads in the cavity 58.

Leakage of water between the threads 49 and 50 is prevented by suitable packing 60 which is held in place by a gland nut 61 rotatably mounted on the stem 48 and provided with internal threads for engagement with external threads on the dish washing fixture casting.

In the normal operation of the fixture the valves 47 and 53 are positioned to close the ports 46 and 52. The fixture may then be operated to discharge water from the faucet 21 merely by swinging it from the dotted line positions of Figs. 1 and 4 to the full line positions shown therein. When it is desired to wash dirty dishes in the sink the faucet 21 is returned to its dotted line position (Figs. 1 and 4) thus stopping the discharge of water from the faucet. The handle 51 is then manipulated to open the port 46. The water, mixed to the proper temperature, flows through the port 46 and enters the soap reservoir 35 where it swirls through the soap chips. The hot soapy water passes out of the reservoir 35 through the outlet 41, conduit 42, hose 43 to the spray nozzle 44. To clear the dishes from the soapy water the handle 56 is rotated to open the port 52. Then the handle 51 is rotated to close the port 46. Clean hot water is thus conducted from the chamber 29 directly to the conduit 42 from which the clean hot water passes to the spray nozzle 44. After the dish washing operation the valve 53 is returned to its normal position where it closes the port 52.

It will be clear to those skilled in the art and with the general objects of the present invention in view that changes may be made in the details of structure, the described and illustrated embodiment thereof being intended as an exploitation of its underlying essentials the features whereof are definitely stated in their true scope in the claims herewith.

What is claimed as new, is:

1. A fixture having, in combination, a mixing chamber, a port therein, a hot and cold water supply connected to the mixing chamber, a faucet connected to the port in the mixing chamber for discharging water therefrom, a valve for closing the port in the mixing chamber, a secondary chamber open to the mixing chamber, a dish washing discharge conduit, a port in the secondary chamber open to the conduit, a soap reservoir having an inlet and an outlet, said outlet open to the conduit, a port in the secondary chamber open to said inlet, and valves for controlling said ports in the secondary chamber to flow water from the secondary chamber to said conduit by way of the soap reservoir or to flow water from the secondary chamber directly to said conduit, or to prevent the flow of water therethrough.

2. A fixture having, in combination, a mixing chamber, a port therein, a hot and cold water supply connected to the mixing chamber, a faucet connected to the port in the mixing chamber for discharging water therefrom, a valve for closing the port in the mixing chamber, a secondary chamber open to the mixing chamber, a dish washing discharge conduit, a port in the secondary chamber open to the conduit, a soap reservoir having an inlet and an outlet, said outlet open to the conduit, a port in the secondary chamber open to said inlet, a valve having a stem for controlling the port between the secondary chamber and the conduit, and a second valve having a stem for controlling the port between the secondary chamber and the inlet to the soap reservoir.

3. A fixture having, in combination, a mixing chamber, a port therein, a hot and cold water supply connected to the mixing chamber, a faucet connected to the port in the mixing chamber for discharging water therefrom, a valve for closing the port in the mixing chamber, a secondary chamber open to the mixing chamber, a dish washing discharge conduit, a port in the secondary chamber open to the conduit, a soap reservoir having an inlet and an outlet said outlet open to the conduit, a port in the secondary chamber open to said inlet, a valve having a stem for controlling the port between the secondary chamber and the conduit, and a second valve having a stem for controlling the port between the secondary chamber and the inlet to the soap reservoir, one of said stems being mounted for rotation with the other stem.

4. A fixture having, in combination, a mixing chamber, a port therein, a hot and cold water supply connected to the mixing chamber, a faucet connected to the port in the mixing chamber for discharging water therefrom, a valve for closing the port in the mixing chamber, a secondary chamber open to the mixing chamber, a dish washing discharge conduit, a port in the secondary chamber open to the conduit, a soap reservoir having an inlet and an outlet, said outlet open to the conduit, a port in the secondary chamber open to said inlet, a valve having a stem for controlling the port between the secondary chamber and the conduit, and a second valve having a stem for controlling the port between the secondary chamber and the inlet to the soap reservoir, the first named stem being mounted for rotation within the other stem.

5. A fixture having, in combination, a mixing chamber, a port therein, a hot and cold water supply connected to the mixing chamber, a faucet connected to the port in the mixing chamber for discharging water therefrom, a valve for closing the port in the mixing chamber, a secondary chamber open to the mixing chamber, provided with a bridge, a dish washing discharge conduit, a port in the secondary chamber open to the conduit, a soap reservoir having an inlet and an outlet, said outlet open to the conduit, a port in the secondary chamber open to said inlet, a valve having a stem for controlling the port between the secondary chamber and the conduit, and a second valve having a stem for controlling the port between the secondary chamber and the inlet to the soap reservoir; the opposite ends of said first named stem being journaled in said bridge and within the second named stem, respectively.

6. A dish washing fixture for attachment to the mixing chamber of a hot and cold water fixture having, in combination, a single casting having a central opening therein forming a chamber, a pair of ports having the same longitudinal axis formed in the opposite side walls of the chamber, respectively, valves for independently closing the two ports, a hollow globular reservoir formed in the casting above the chamber, and a pair of openings, formed in the bottom of the reservoir, the inside walls of which are common with the ported walls of the chamber, respectively.

In testimony whereof I have signed my name to this specification.

GEORGE VICTOR GAVAZA.